United States Patent [19]

Gwilliam

[11] 3,753,499
[45] Aug. 21, 1973

[54] TUBE PRESSURE FILTERS
[75] Inventor: Ralph Derek Gwilliam, Cornwall, England
[73] Assignee: English Clays Lovering Pochin & Company Limited, Cornwall, England
[22] Filed: Aug. 2, 1971
[21] Appl. No.: 167,910

[30] Foreign Application Priority Data
Aug. 7, 1970  Great Britain.................. 38,297/70

[52] U.S. Cl. ................................ 210/350, 100/211
[51] Int. Cl. ............................................. B01d 29/42
[58] Field of Search ................... 210/232, 350, 351; 100/211

[56] References Cited
FOREIGN PATENTS OR APPLICATIONS
244,142  12/1962  Australia............................. 210/351

*Primary Examiner*—Samih N. Zaharna
*Assistant Examiner*—T. A. Granger
*Attorney*—Larson, Taylor & Hinds

[57] ABSTRACT

A tube pressure filter which comprises (a) a pair of generally coaxial inner and outer tubular bodies arranged one within the other and adapted to be supported in a generally upright position; (b) an impermeable elastic sleeve disposed within and secured to the outer tubular body; (c) a filter element disposed around and supported by the inner tubular body; and (d) means for displacing the tubular bodies axially relative to one another, wherein the impermeable elastic sleeve includes at least one means for ensuring that at least one annular portion of a filter cake formed on the filter element is substantially thinner than the major part of said filter cake, the or all of said annular portion(s) extending over a minor proportion of the length of said filter cake.

12 Claims, 2 Drawing Figures

TUBE PRESSURE FILTERS

BACKGROUND OF THE INVENTION

This invention relates to apparatus for reducing the liquid content of wet particulate solid materials.

It has been well known for many years to reduce the liquid content of wet particulate solid materials, for example in the form of a slurry, by means of plate filter presses. When treating slurries of solid materials such as clays, chalks and satin white which contain a relatively high percentage, say more than 20 percent, of particles smaller than 20 microns, it is necessary to employ high pressures to produce a filter cake of low moisture content. However, serious engineering problems arise with conventional plate filter presses when it is desired to operate at very high pressures, for example in excess of 1,000 pounds per square inch (p.s.i.). Consequently, in recent years there have been developed tube pressure filters which are capable of operating at such high pressures. Various kinds of tube pressure filter have been described; see, for example U.K. Patent specification Nos. 907,485 and 1,240,465.

One kind of tube pressure filter essentially comprises a pair of generally coaxial inner and outer tubular bodies arranged one within the other and adapted to be supported in a generally upright position; an impermeable elastic sleeve disposed within and secured to the outer tubular body; a filter element disposed around and supported by the inner tubular body; and means for displacing the tubular bodies axially relative to one another between a first position and a second position; wherein the arrangement is such that in the first position of said tubular bodies they cooperate with each other to define a closed chamber of annular cross-section which is divided into generally coaxial and non-intercommunicating inner and outer compartments by said impermeable elastic sleeve, the inner compartment including an inlet for a wet particulate solid material to be pressure filtered and the outer compartment including an inlet for a hydraulic fluid under pressure, and in the second position of said tubular bodies said chamber is opened to enable particulate solid material to be discharged from the inner compartment. The inner tubular body and the filter element are constructed and arranged so that in use, when the tubular bodies are in their first position, liquid can flow through the filter element and can be discharged, for example through apertures in the inner tubular body, while solid material is retained on the filter element, the liquid being caused to flow through the filter element by the introduction of a hydraulic fluid under pressure into the outer compartment which hydraulic fluid urges the impermeable elastic sleeve towards the filter element so as to compress wet particulate solid material in the inner compartment and express liquid therefrom, and when the tubular bodies are in their second position the chamber of annular cross-section is opened and the solid material can be discharged from the inner compartment.

It has been found that when some materials are pressure filtered, there is a tendency for the filter cake to adhere to the filter element thereby rendering more difficult the discharge of the filter cake.

It is an object of the present invention to provide a tube pressure filter having a reduced tendency for the filter cake to adhere to the filter element.

Tube pressure filters of the kind described above which have been manufactured heretofore have been constructed and arranged so that, on compaction of a wet particulate solid material in the inner compartment of the tube pressure filter, a filter cake of substantially uniform thickness is formed.

SUMMARY OF THE INVENTION

According to one aspect of the present invention there is provided a tube pressure filter which comprises a pair of generally coaxial inner and outer tubular bodies arranged one within the other and adapted to be supported in a generally upright position; an impermeable elastic sleeve disposed within and secured to the outer tubular body; a filter element disposed around and supported by the inner tubular body; and means for displacing the tubular bodies axially relative to one another between a first position and a second position; wherein the arrangement is such that in the first position of said tubular bodies they cooperate with each other to define a closed chamber of annular cross-section which is divided into generally coaxial and non-interconnecting inner and outer compartments by said impermeable elastic sleeve, the inner compartment including an inlet for a wet particulate solid material to be pressure filtered and the outer compartment including an inlet for a hydraulic fluid under pressure, whereby a filter cake of a particulate solid material can be formed on the filter element, and in the second position of said tubular bodies said chamber is opened to enable a filter cake of particulate solid material to be discharged from the inner compartment; and wherein the impermeable elastic sleeve includes at least one means for ensuring that at least one annular portion of the filter cake is substantially thinner than the major part of said filter cake, the or all of said annular portion(s) extending over a minor proportion of the length of said filter cake.

It has now been found that discharge of the filter cake is facilitated if at least one annular portion of the filter cake is substantially thinner than the remainder thereof. The or each annular portion of the filter cake is preferably of relatively short length in comparison with the length of the entire filter cake. This can be achieved by employing an impermeable elastic sleeve which includes at least one annular portion which is substantially thicker than the remainder thereof, the thicker portion being shaped and positioned along the length of the impermeable elastic sleeve so as to correspond with the desired shape and position of the annular portion(s) of the filter cake which is or are to be substantially thinner than the remainder thereof.

The present invention also provides an impermeable elastic sleeve which comprises a central cylindrical portion located between two flared end portions, the flared end portions terminating in annular beadings, and one or more annular protrusions located on a surface of the impermeable elastic sleeve.

DESCRIPTION OF THE PREFERRED EMBODIMENTS

Figure 1:
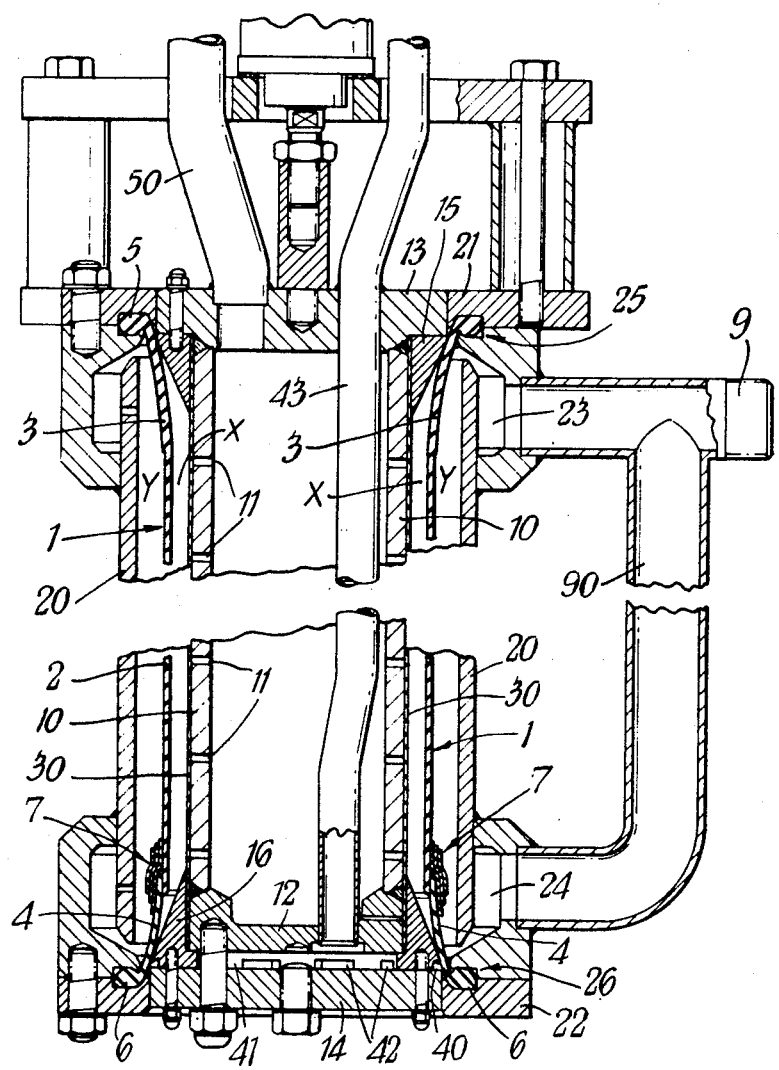

The protrusions or thicker portion of the impermeable elastic sleeve can be formed by attaching on or more cuffs to the inside or outside of a sleeve of uniform thickness. These cuffs can be made from the same or a similar material as the impermeable elastic sleeve itself and can be secured thereto by, for example, a solvent-based adhesive, the surfaces to be joined preferably being buffed and/or chemically cleaned, e.g., with an isocyanate, before joining. It is preferred to attach the one or more cuffs to the outer surface of the impermeable elastic sleeve; with this arrangement the cuffs and the impermeable elastic sleeve can be cut from a single tube and the cuffs then stretched slightly in order to slip them over the outer surface of the remainder of the impermeable elastic sleeve. Alternatively, the impermeable elastic sleeve including the cuffs can be formed as an integral unit from, for example, calendered sheet rubber by bonding the components together by vulcanising in steam in a suitable mould. It has been found to be advantageous for the thickness of the impermeable elastic sleeve to change abruptly at the upper extent of the or each annular portion of the impermeable elastic sleeve. In this way, when the tube pressure filter is in use, an abrupt change in the thickness of the filter cake is produced by the filter pressing operation.

Preferably, the impermeable elastic sleeve comprises a central cylindrical portion, trumpet-shaped end portions terminating in annular beadings, and one or more cuffs at that end of the sleeve which will be secured to the lower end of the outer tubular body. Advantageously, a number of cuffs are superimposed one upon the other to overlie the junction between the central cylindrical portion and the lower of the two trumpet-shaped end portions. The central cylindrical portion is preferably made from a material having a tensile strength in the range of from 3,000–4,000 lbs/in$^2$, a modulus at 500 percent extension in the range of from 800–1,400 lbs/in$^2$ when measured according to B.S. 903:Part A2, 1971, an elongation at break of from 700–800 percent, and a Shore hardness of from 35–45. The trumpet-shaped end portions are preferably made from a material having a tensile strength in the range of from 2,500–3,500 lbs/in$^2$, a modulus at 300 percent extension in the range of from 1,500–2,000 lbs/in$^2$ (B.S.903:Part 2, 1971), an elongation at break of from 450–550 percent, and a Shore hardness of from 60–70.

The use of an impermeable elastic sleeve constructed in accordance with the present invention has been found to be particularly useful when the inner tubular body comprises a central cylindrical section, around which there is disposed the filter element, and upper and lower end sections each of which end sections includes a radially outwardly extending flange portion, which co-operates with the adjacent portion of the outer tubular body to close the chamber when said tubular bodies are in their first position, and a fairing mounted on or adjacent to said flange portion so as to extend around said central cylindrical section and an end of the filter element. When the inner tubular body is constructed in this manner, the or one of the annular portion(s) of the filter cake which is thinner than the remainder thereof should be formed just above the vertex of the lower fairing.

When the total length of the filter cake is about 1,700 mm or greater and a single annular portion of the filter cake is to be substantially thinner than that of the remainder of the filter cake, the length of the annular portion is preferably about 90 millimetres or less. The length of the annular portion required for optimum operation is substantially independent of the total length of the filter cake for a considerable range of filter cake lengths, but will not generally be greater than about 6 percent of the total length of the filter cake.

The tube pressure filters of the present invention are preferably constructed and arranged generally as described in U.K. Pat. specification No. 1,240,465. Thus, the inlet to the inner compartment is preferably adapted to deliver a wet particulate solid material to be pressure filtered to the bottom of the inner compartment and to distribute it substantially uniformly around the inner tubular body when the tubular bodies are supported in a generally upright position and in their first position. For example, the inlet of the inner compartment can advantageously comprise a plurality of apertures or ducts disposed around the lower end section of the inner tubular body in or adjacent to the fairing, whereby the wet particulate solid material to be pressure filtered can be delivered to the bottom of said inner compartment and distributed substantially uniformly around the inner tubular body. This construction and arrangement of the tube pressure filter is particularly well suited for use in reducing the liquid content of wet particulate solid materials such as clays, chalk whiting and satin white comprising 20 percent or more by weight of particles smaller than 20 microns; but the tube pressure filters of the invention can, of course, be used for reducing the liquid content of other wet particulate solids. It is also advantageous, as described in U.K Pat. specification No. 1,240,465, for the inner tubular body to comprise a central cylindrical section and upper and lower end sections, each of which end sections includes a cap which is of a larger external diameter than said central cylindrical section and which closes the inner tubular body whereby the introduction of, for example, compressed air into the interior of the inner tubular body will bring about or facilitate the discharge of filter cake from the inner compartment when the tubular bodies are in their second position. With this arrangement, the fairings are mounted on or adjacent to said caps (the rims of which constitute radially outwardly extending flange portions) so as to extend around said central cylindrical section and the ends of the filter element.

In order to ensure that the chamber of annular cross-section is closed when the tubular bodies are in their first position a ring-seal, preferably an O-ring seal, can be mounted in the end portions of one or both of the tubular bodies, preferably the inner tubular body, so as to co-operate with a surface of adjacent end portions of the other tubular body, the ring seal being made from an elastic or plastic material so as to reduce to zero the gap between the ring seal and the surface co-operating therewith. Instead of an O-ring seal there can be used, for example, a U-ring seal or a cup-ring seal. It is possible to eliminate the ring seal as long as the inner and outer tubular bodies are provided with adjacent end portions which are a close fit.

When used for treating particulate solid materials comprising 20 percent or more by weight of particles smaller than 20 microns, the outer tubular body preferably comprises a cylindrical central section having an internal diameter not greater than 12 inches or less than 4 inches and the inner tubular body preferably comprises a cylindrical central section having an internal diameter which differs from the internal diameter of the cylindrical central section of the outer tubular body by from 2 inches to 7 inches. More particularly, when the internal diameter of the cylindrical central section of the outer tubular body is 12 inches, the external diameter of the cylindrical central section of the inner tubular body preferably lies in the range 5 to 8 inches; and when the internal diameter of the cylindrical central section of the outer tubular body is 4 inches, the external diameter of the cylindrical central section of the inner tubular body lies in the range 0.8 to 2 inches. Again, when treating materials comprising 20 percent or more by weight of particles smaller than 20 microns the inlet of the inner compartment is connected to means for introducing the wet, particulate solid material to be pressure filtered under pressure, generally at least 25 p.s.i.g., into the inner compartment in a manner such that said wet particulate solid material is charged to the bottom of said inner compartment and distributed substantially uniformly around the inner tubular body so as to scour the fairing and that part of the filter element supported by the lower portion of the inner tubular body.

It is advantageous for the impermeable elastic sleeve to be secured to the lower end of the outer tubular body at a position adjacent the radially outwardly extending flange portion at the lower end section of the inner tubular body so that when hydraulic fluid is introduced into the outer compartment the elastic sleeve is urged towards the fairing mounted on or adjacent to the lower radially outwardly extending flange portion.

The filter element disposed around and supported by the inner tubular body will advantageously comprise a filter cloth which is formed from a thermoplastic continuous filament man-made polymeric material which has been heat set, e.g., by hot calendering; such a material can have a pore size sufficiently small to prevent the particulate solid material from passing therethrough, and the use of a continuous filament material gives the filter cloth good release properties. The thermoplastic continuous filament manmade polymeric material can be, for example, polyethylene terephthalate or a nylon. The filter cloth can also be formed from a material, such as a synthetic needle cloth, a heavy weight cotton cloth or a felted woollen cloth, which has been subjected to gentle singeing to remove projecting fibres and thus improve the release properties of the filter cloth. In some embodiments of the invention, it may be advantageous to render the lower part of the filter cloth impermeable. It may also be advantageous to support the filter cloth on a coarse weave backing cloth or on a wire mesh which extends in the manner of a sleeve over the inner tubular body and which is optionally covered with a coarse weave backing cloth.

The operation of the tube pressure filter of the present invention is preferably carried out in the manner described in U.K. Pat. specification No. 1,240,466, the process described therein comprising the steps of (i) supporting the tube pressure filter in an upright position with the tubular bodies in their first position (ii) introducing the wet particulate solid material under pressure into the inner compartment of the tube pressure filter whilst introducing into the outer compartment of said tube pressure filter a hydraulic fluid having a specific gravity which differs by not more than 0.05 units from that of said wet particulate solid material, the wet particulate solid material being introduced into said inner compartment in a manner such that it is charged to the bottom of said inner compartment and is distributed substantially uniformly around the inner tubular body and scours that part of the filter element supported by the lower portion of the inner tubular body, (iii) raising said hydraulic fluid to a high pressure and maintaining said hydraulic fluid at said high pressure for a time sufficient to effect a reduction in the liquid content of the wet particulate solid material, (iv) withdrawing from the outer compartment the hydraulic fluid, (v) thereafter displacing the tubular bodies of the tube pressure filter axially relative to one another to their second position, and (vi) removing the particulate solid material from the surface of the filter element.

After a pressure filtering operation the particulate solid material forms a filter cake which can be removed from the filter element by known means. For example, if the inner tubular body is closed by caps one or more air blasts can be delivered to the interior of the inner tubular body and to the downstream side of the filter element. With such a system, during the operation of the pressure filter the amount of material treated is preferably selected so that the thickness of the filter cake formed on the filter element is not so thin that it flexes and does not break or so thick that a long operating cycle is required with a consequential reduction in the throughput of the apparatus. For example, with very finely divided solids such as clays, chalks and satin white the general filter cake thickness should be not less than 0.2 inches to ensure that it is broken by the air blasts and does not flex, and generally not more than 0.3 inches to obtain maximum throughput since it is found that a thicker cake requires a disproportionately longer operation cycle. Preferably, the filter cake is removed from the filter element by a number of short, discrete air blasts, rather than by one long blast, since the repeated increase and decrease in the diameter of the filter element coupled with the air pressure is more effective than the air pressure alone in releasing the filter cake.

Figure 2:
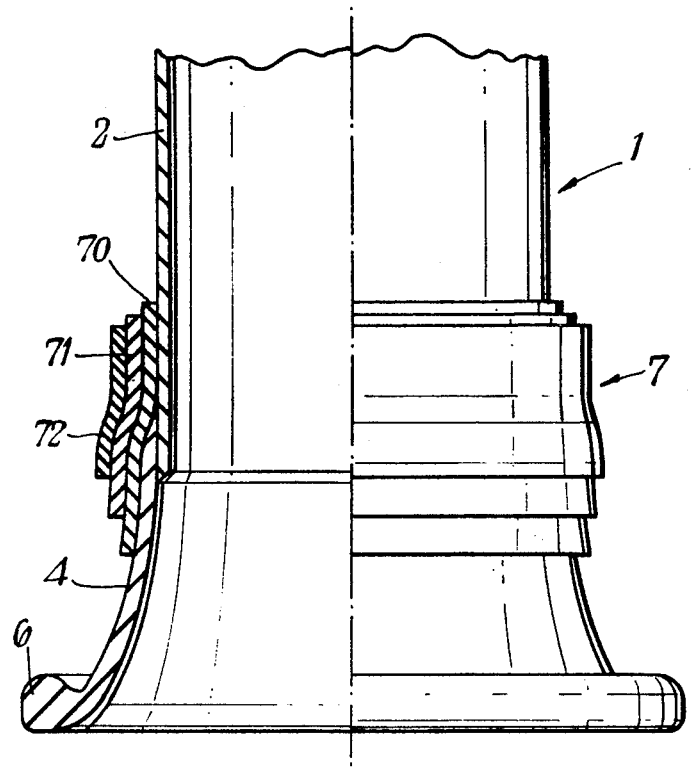

For a better understanding of the invention, and to show how the same can be carried into effect, reference will now be made, by way of example, to the accompanying drawings, in which:

FIG. 1 shows a tube pressure filter in accordance with the present invention; and FIG. 2 shows an enlarged view (not to scale) of the lower part of the impermeable elastic sleeve used in the tube pressure filter of FIG. 1.

Referring to the drawings, there is shown a tube pressure filter comprising an outer tubular body and an inner tubular body arranged co-axially one within the other and adapted to be supported in a generally upright position. The outer tubular body comprises a central cylindrical section 20, end-sections 21 and 22, and annular galleries 23 and 24. The end-section 21 and annular gallery 23, and the end-section 22 and annular gallery 24, are constructed and arranged so that, when the tube pressure filter is ready for use, they provide respective recesses 25 and 26 in which are located, respectively, annular beadings 5 and 6 constituting the ends of an impermeable elastic sleeve 1. A conduit 9 is provided for the supply of a hydraulic fluid to the tube pressure filter; this conduit is connected to a further conduit 90 which provides a connection between the upper annular gallery 23 and the lower annular gallery 24.

The inner tubular body comprises a central cylindrical section 10, and upper and lower end sections. The upper end section comprises a cap 13 which has a radially outwardly extending flange portion on which is mounted a fairing 15. The lower end section comprises an inner cap 12 and an outer cap 14 which has a radially outwardly extending flange portion on which is mounted a fairing 16. The inner tubular body is formed with a number of apertures such as those indicated as 11.

A filter element 30 extends around and is supported by the inner tubular body.

A compressed air line 50 passes into the interior of the inner tubular body.

The impermeable elastic sleeve 1 comprises a central cylindrical portion 2, trumpet-shaped end portions 3 and 4 which terminate in annular beadings 5 and 6, respectively, and a number of cuffs 7. The impermeable elastic sleeve is secured in liquid-tight manner to the outer tubular body through the agency of the annular beadings 5 and 6 which are located in the recesses 25 and 26. The cuffs 7 are adhesively secured to the lower end of, and on the outside of, the impermeable elastic sleeve so as to overlie the junction of the central cylindrical portion 2 and end portion 4. With cuffs in this position, when the tube pressure filter is in operation, a filter cake of negligible thickness is formed immediately above the fairing 16.

The central cylindrical portion 2 of the impermeable elastic sleeve was made from a calendered sheet of white surgical rubber of thickness 0.070 inch which was wrapped round a mandrel, the free edges being joined by a butt joint and the seam covered with a single strip of the same rubber. The tube thus formed was then vulcanised in steam. The trumpet-shaped end portions 3 and 4 were each made of a natural rubber compound comprising carbon black as a filler, and were formed and vulcanised in a specially designed mould. The cuffs 7 were cut from the tube used for the central cylindrical portion 2, and all the components were joined together with adhesive after first cleaning and buffing all the surfaces to be joined. The physical properties of the central cylindrical portion and the end portions were as follows:

| | Central cylindrical portion | End portions |
|---|---|---|
| Tensile strength ($1bf/in^2$) | 3650 | 3000 |
| Modulus at 300% extension ($1bf/in^2$) | — | 1900 |
| Modulus at 500% extension ($1bf/in^2$) | 1050 | — |
| Elongation at break % | 765 | 500 |
| Shore hardness | 42 | 70 |

The impermeable elastic sleeve 1 divides the chamber of the pressure filter into non-intercommunicating inner and outer compartments X and Y.

A wet particulate solid material to be pressure filtered is introduced under pressure X through a plurality of slots 42 which communicate with a groove 40 and with a chamber 41 to which a slurry of material to be pressure filtered is fed by a pipe 43.

A siphon tube (not shown) extends into the interior of the inner tubular body through upper cap 13 and, in use, removes the filtrate from the interior of the inner tubular body.

The lower part of the impermeable elastic sleeve is shown in greater detail in FIG. 2, the left-hand half of the Figure being an axial section and the right-hand half of the Figure being an elevation. The impermeable elastic sleeve 1 comprises a central cylindrical portion 2 to which are gummed a number of cuffs 7 and a trumpet-shaped end portion 4 which terminates in an annular beading 6. The cuffs 7 comprise three layers, 70, 71 and 72, the innermost layer 70 overlapping the trumpet-shaped end portion 4. The cuffs 70, 71 and 72 are gummed to each other.

In operation of the tube pressure filter, a material to be pressure filtered is introduced into compartment X via pipe 43, chamber 41, slots 42 and groove 40, and a hydraulic fluid is introduced into compartment Y through conduits 9 and 90. The pressure of the hydraulic fluid causes the impermeable elastic sleeve 1 to compress the material being pressure filtered against filter element 30 so as to express filtrate through the filter element and through the apertures 11 into the interior of the inner tubular body. The cuffs 7 of the impermeable elastic sleeve 1 produce an annular portion of the filter cake which is of almost negligible thickness and which is located immediately above the fairing 16. The siphon tube removes the filtrate from the inner tubular body and the hydraulic fluid is evacuated from compartment Y. Thereafter the inner and outer tubular bodies are displaced axially relative to one another to their second position so that filter cake which is supported on the filter element can be discharged from the inner compartment by blowing compressed air through the filter element from within the inner tubular body. The weakness of the extremely thin annular portion of filter cake immediately above fairing 16 facilitates discharge of the filter cake.

I claim:

1. In a tube pressure filter which comprises (a) a pair of generally coaxial inner and outer tubular bodies arranged one within the other and adapted to be supported in a generally upright position; (b) an impermeable elastic sleeve disposed within and secured to the outer tubular body; (c) a filter element disposed around and supported by the inner tubular body; and (d) means for displacing the tubular bodies axially relative to one another between a first position and a second position, wherein the arrangement is such that in the first position of said tubular bodies they co-operate with each other to define a closed chamber of annular cross-section which is divided into generally coaxial and non-intercommunicating inner and outer compartments by said impermeable elastic sleeve, the inner compartment including an inlet for a wet particulate solid material to be pressure filtered and the outer compartment including an inlet for hydraulic fluid under pressure, whereby a filter cake of a particulate solid material can be formed on the filter element, and in the second position of said tubular bodies said chamber is opened to enable a filter cake of particulate solid material to be discharged from the inner compartment, the improvement which comprises employing an impermeable elastic sleeve which elastic sleeve comprises a central portion for transmitting pressure to the wet particulate solid material in the inner compartment and flared end portions for securing the elastic sleeve to the outer tubular body and wherein the central cylindrical portion includes at least one annular thickened portion whereby at least one annular segment of the filter cake which is produced on the filter element is substantially thinner than the major part of said filter cake and is indented with reference to the outer surface of said major part of the filter cake, said at least one annular segment extending over a minor proportion of the length of said filter cake.

2. A tube pressure filter as claimed in claim 1, wherein said annular thickened portion of the elastic sleeve is located so that said annular segment occurs at the bottom of the filter cake.

3. A tube pressure filter as claimed in claim 1, wherein the thickness of said impermeable elastic sleeve changes abruptly at the upper extent of the annular thickened portion of the impermeable elastic sleeve.

4. A tube pressure filter as claimed in claim 1, wherein said annular thickened portion of the impermeable elastic sleeve comprises at least one cuff attached to said impermeable elastic sleeve.

5. A tube pressure filter as claimed in claim 4, wherein said at least one cuff is attached to the outer surface of said impermeable elastic sleeve.

6. A tube pressure filter as claimed in claim 1, wherein said at least one said annular thickened portion of the elastic sleeve extends over not more than 6 percent of the total length of the central cylindrical portion of the elastic sleeve.

7. A tube pressure filter as claimed in claim 4, wherein said at least one annular thickened portion of the elastic sleeve extends over not more than 6 percent of the total length of the central cylindrical portion of the elastic sleeve.

8. A tube pressure filter as claimed in claim 1, wherein said flared end portions of the impermeable elastic sleeve are trumpet-shaped and terminate in annular beadings, which are located in corresponding recesses in the outer tubular body, and wherein a number of cuffs are superimposed one upon the other at the lower end of the central cylindrical portion of the impermeable elastic sleeve so as to overlie the junction between said central cylindrical portion and the lower of the trumpet-shaped end portions.

9. A tube pressure filter as claimed in claim 1, wherein the internal wall of the inner tubular body defines a substantially closed chamber, wherein the inner tubular body includes apertures for the passage therethrough of filtrate and wherein there is provided means for removing from the interior of the inner tubular body filtrate which has passed through the filter element and through the apertures in the inner tubular body.

10. A tube pressure filter as claimed in claim 9, wherein there are provided means for producing a blast of air within said substantially closed chamber so as to remove the filter cake from the surface of the filter element after said particulate solid material has been pressure filtered and the inner and outer tubular bodies have been axially displaced relative to one another to their second position.

11. A tube pressure filter as claimed in claim 10, wherein said means for producing a blast of air is adapted to produce a plurality of short, discrete air blasts within said substantially closed chamber.

12. A tube pressure filter as claimed in claim 1, wherein the central portion of said elastic sleeve is fabricated from a material having a tensile strength in the range of from 3,000–4,000 lbs/in$^2$, a modulus at 500 percent extension in the range of from 800–1,400 lbs/in$^2$ when measured according to B.S. 903: Part A2, 1971, an elongation at break of from 700–800 percent, and a Shore hardness of from 35–45 and wherein the end portions of said elastic sleeve are fabricated from a material having a tensile strength in the range of from 2,500–3,500 lbs/in$^2$, a modulus at 300 percent extension in the range of from 1,500–2,000 lbs/in$^2$ when measured according to B.S. 903: Part 2, 1971, an elongation at break of from 450–550 percent, and a Shore hardness of from 60–70.

* * * * *